United States Patent [19]
Kauffeld et al.

[11] 3,872,726
[45] Mar. 25, 1975

[54] ELECTRONIC DIGITAL READ-OUT CIRCUIT FOR A CLINICAL THERMOMETER

[75] Inventors: Ludwig Kauffeld, San Diego; Perry V. Holst, Chula Vista, both of Calif.

[73] Assignee: Diatek, Inc., San Diego, Calif.

[22] Filed: Jan. 19, 1972

[21] Appl. No.: 218,787

[52] U.S. Cl. .................... 73/362 AR, 235/92 MT
[51] Int. Cl. ............................................ G01k 7/24
[58] Field of Search ...... 73/362 R, 362 AR; 338/28; 235/92 MT, 92 NT; 340/347 NT

[56] References Cited
UNITED STATES PATENTS

| | | | |
|---|---|---|---|
| 2,728,522 | 12/1955 | Ernst | 73/359 UX |
| 2,926,247 | 2/1960 | Palmer | 73/362 AR UX |
| 2,971,379 | 2/1961 | Weisheit | 73/362 AR |
| 3,165,929 | 1/1965 | Noller | 73/362 AR |
| 3,368,149 | 2/1968 | Wasserman | 340/347 NT |
| 3,377,862 | 4/1968 | Gheorghin | 73/362 AR |
| 3,477,292 | 11/1969 | Thornton | 73/362 AR |
| 3,587,092 | 6/1971 | Kelly et al. | 340/347 NT X |
| 3,620,082 | 11/1971 | Peters | 73/362 AR |
| 3,672,218 | 6/1972 | Hartman | 73/362 AR |
| 3,702,076 | 11/1972 | Georgi | 73/362 AR |
| 3,768,310 | 10/1973 | Krepak | 73/362 AR |

Primary Examiner—S. Clement Swisher
Assistant Examiner—Frederick Shoon
Attorney, Agent, or Firm—Limbach, Limbach & Sutton

[57] ABSTRACT

An electronic circuit for digitally displaying the temperature sensed by a thermistor element and especially adapted for use in monitoring human or animal temperature. An analog voltage signal developed from the thermistor is converted into a digital representation which is used to drive a visual display. In order to decrease the time necessary for obtaining a temperature reading, electronic circuits are provided for forecasting the ultimate temperature that will be sensed by the thermistor prior to the time that the thermistor reaches this temperature.

18 Claims, 9 Drawing Figures

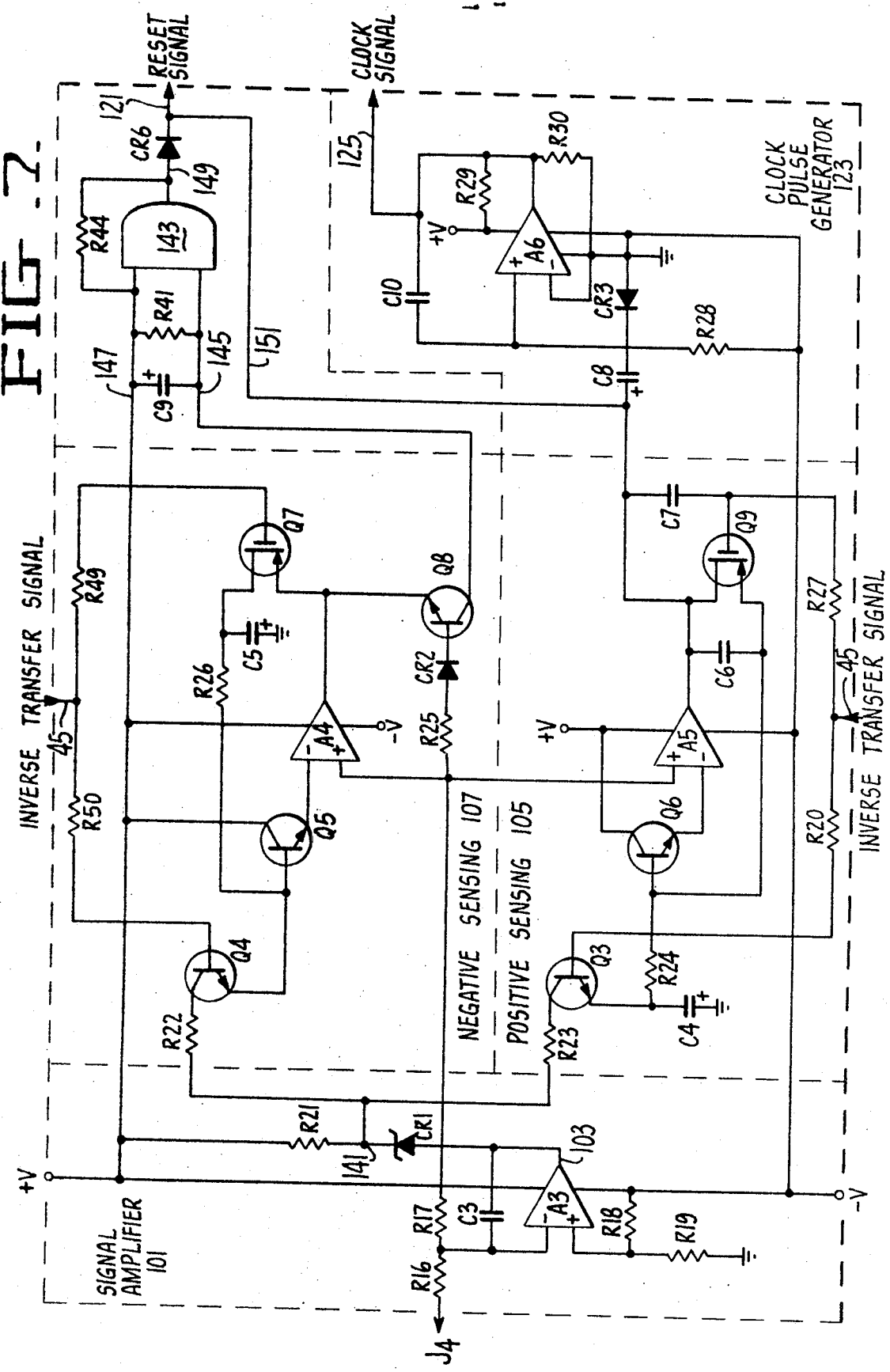

ELECTRONIC DIGITAL READ-OUT CIRCUIT FOR A CLINICAL THERMOMETER

BACKGROUND OF THE INVENTION

This invention relates generally to electronic clinical thermometers and more specifically to electronic circuits for providing a direct readout of a temperature being measured.

Human and animal temperatures have long been determined orally and rectally by doctors and veterinarians with the use of a mercury in glass type of thermometer. A primary disadvantage of the mercury thermometer is the time delay of several minutes that is required for a temperature reading to be registered. In a hospital, for instance, where a nurse is taking the temperature of a large number of patients this time delay adds up to a significant amount of the nurse's time. Furthermore, a mercury thermometer must be reset by the nurse by shaking and it must also be sterilized between patients.

One type of electronic thermometer which has been suggest is represented by the disclosures by U.S. Pat. Nos. 3,469,449 - Keller and 3,540,283 - Dean. In the measuring approach taken by these disclosures, a thermistor or other temperature transducer is mounted on the end of a probe. The probe is inserted into an appropriate cavity of a patient and the thermistor changes electrical characteristics in proportion to the temperature being sent. This electrical characteristic is carried by electrical wires to an accompanying electrical instrument for measuring the temperature. This instrument of the above mentioned patent disclosures includes a digital reading potentiometer which is adjusted until an electrical meter thereon is nulled. The potentiometer position, as indicated by its digital read-out, is then a direct reading of the temperature of the patient. A difficulty of this type of device is that it is also quite time consuming and requires the nurse or other operator of the device to carefully adjust the potentiometer for a null reading, thus presenting the possibility of human error which would result in an erroneous temperature reading. As with a mercury thermometer, these electronic thermometers can be read differently by different operators.

Another type of electronic thermometer presently being marketed and used by others processes the information obtained from a thermistor or other temperature transducer in a more rapid manner and directly presents a temperature reading digitally without any balancing or other adjustments by the nurse or other operator of the device. Temperature readings can be obtained much faster than by earlier devices described above. However, among the disadvantages of this commercially available unit is the restriction that it can only be used where the temperature of the body to be measured is higher than the temperature of the thermistor probe unit prior to the measurement. If the temperature of the probe is higher than that of the body being measured when the measurement is first begun, this commercially available instrument is not capable of obtaining a temperature reading.

Therefore, it is an object of the present invention to obtain a temperature reading in the fastest possible time when the temperature of the sensor is driven either up or down by the body being measured.

It is another object of the present invention to provide an electronic circuit for calculating and displaying the temperature sensed by a transducer with extreme accuracy.

It is a further object of the present invention to provide an electronic calculating and display device capable of measuring temperature directly in degrees Centigrade or degrees Fahrenheit by a simple adjustment.

It is yet another object of the present invention to provide a portable battery operated temperature measuring and display device whose accuracy is not dependent on the voltage of the batteries.

SUMMARY OF THE INVENTION

Various features of an electronic clinical thermometer which utilizes the various aspects of the present invention are briefly and generally described, more detail being set forth in the detailed description given hereinafter with respect to the drawings. The circuit utilizing the various aspects of the present invention employs an electrical bridge with a thermistor in one leg of the bridge. The output of the bridge is made to be a substantially linear one with respect to the temperature being sensed by the thermistor over a limited range by a proper selection of the resistors in the bridge circuit. This voltage analog of temperature is converted to a digital representation by an integrating analog-to-digital converter. For a given instrument, the thermistor and bridge circuit are fixed in value. A capacitor in the feedback loop of a differential amplifier performs the integration. This capacitor is alternately charged and discharged. It is charged by the voltage from the bridge circuit, so its charge is representative of the temperature being detected by the thermistor during the charging cycle. The time necessary to discharge the capacitor is measured by a free-running digital counter, the number of clock cycles which occur during the discharge of the capacitor being representative of the temperature being measured. It is this number that is displayed as the digital readout indication of temperature.

The continuously running counter emits an overflow signal when it reaches the maximum count and then begins again. This overflow signal is utilized to begin the capacitor discharging. A special detector is utilized to sense when the capacitor has discharged to a certain level and at this point the capacitor begins to charge again.

The instrument described hereinafter with the various aspects of the present invention utilized therein includes two modes of operation. A "monitoring mode" displays digitally the temperature value being sensed each time the integrating capacitor is discharged. As the temperature sensed goes up and down, so does the temperature reading being displayed. There is normally some time lag due to a heat inertia of the temperature probe and a final temperature reading of the body will be had when operating in this mode after the probe reaches the same temperature as the body being measured.

In a second operating mode of the device, referred to as it "temperature mode," a final temperature reading is presented at the display of the device without having to wait for the thermistor probe to reach the same temperature as the body being measured. In this mode, the ultimate temperature of the probe is forecasted by observing rise or decline characteristics of the probe temperature. The slope of the temperature is monitored and when this slope becomes less than a predetermined value, a reading is displayed on the device. This reading is the probe temperature where the slope of a predetermined value is detected, plus a fixed amount that is the difference between the body temperature and the temperature of the probe where the predetermined slope value is detected. The purpose of such a circuit is to shorten the time necessary to obtain a reading of the body temperature. Both positive and negative temperature changes of the probe are monitored by separate circuits for each function.

Every thermistor is likely to have slightly different characteristics even though they are manufactured with the intent of having them all the same. Therefore, the bridge circuit is provided with resistors in two legs thereof that are slightly adjustable to take into account any variations in individual thermistors. The bridge circuit is contained in a receptacle at the end of a cord connecting the thermistor containing probe to the electronic display circuit. This plug is removably attached onto the electronic display circuit case. Since the bridge circuit is adjusted for the individual thermistor, this thermistor may be moved from one display circuit to another display circuit without affecting the accuracy of readings obtained.

A circuit utilizing various aspects of the present invention also has the advantage that it directly reads in degrees Fahrenheit or degrees Centigrade. The values of two resistors in the circuit are changed depending on whether degrees Fahrenheit or degrees Centigrade are to be read. This is controlled by the plug associated with the thermistor. Each plug has certain of its contacts connected in one of two ways, depending whether degrees Centigrade or degrees Fahrenheit are desired to be read on the instrument.

For simplicity of operation, no separate switch is provided for selecting between the "monitoring" and the "temperature" modes of operation. Switching between the two modes is accomplished by turning the power to the circuit off. When it is turned back on again, the mode in which the circuit is set to operate depends upon how long the circuit has remained off from its previous period of operation. This is accomplished by the use of two capacitor-resistor circuits having different time constants, each capacitor-resistor circuit being connected to opposing inputs of a flip-flop circuit. When no power has been on for a substantial period of time, turning on the power will place the instrument in the "temperature mode." When power has been interrupted for only a short time, restoring the power to the instrument will place it in the "monitoring mode."

BRIEF DESCRIPTION OF THE DRAWINGS

FIG. 7 is a detailed circuit diagram of the signal amplifier, the positive and negative change sensing circuits and pulse generator blocks of the circuit of FIG. 1;

DESCRIPTION OF THE PREFERRED EMBODIMENTS

Figure 1:
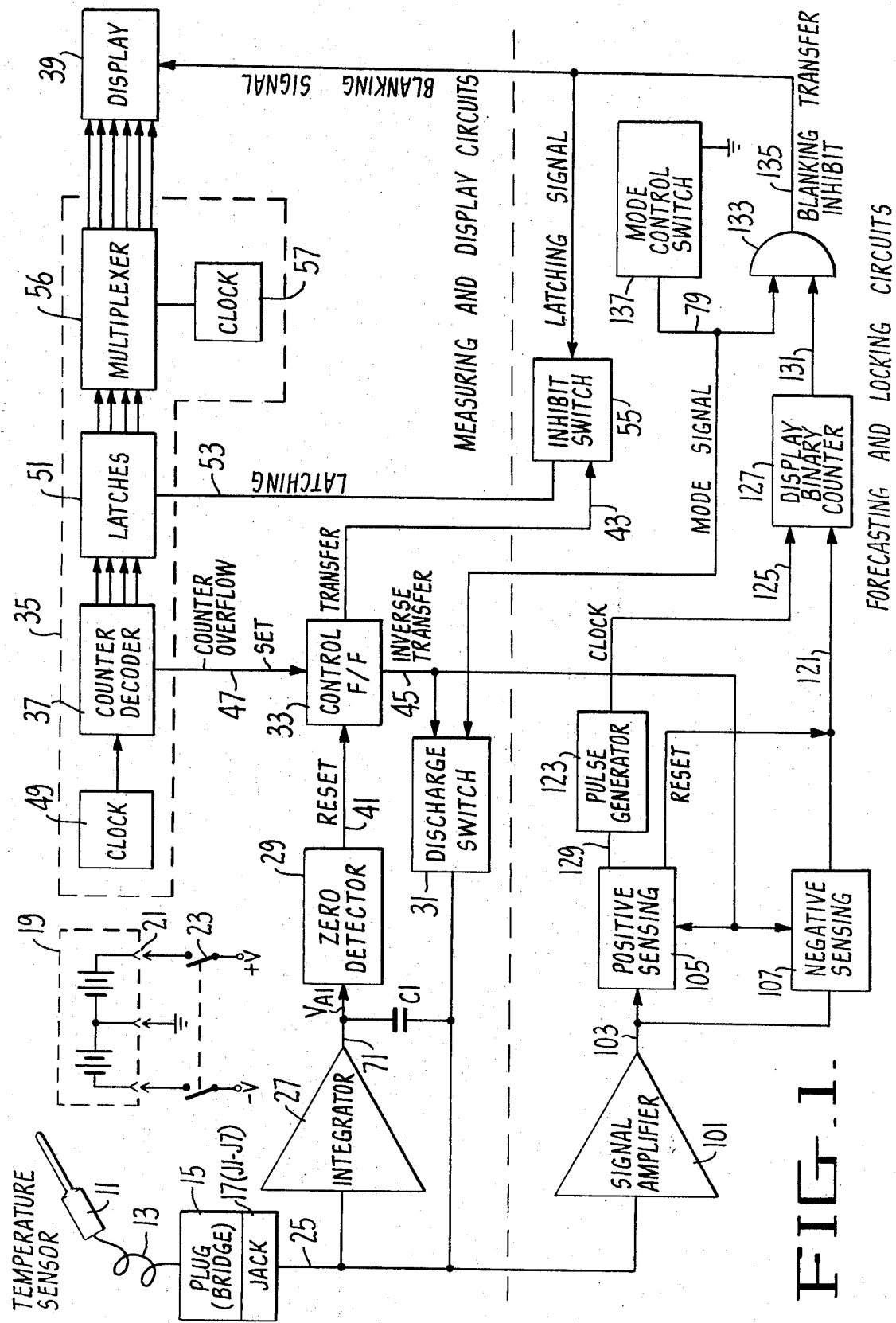
FIG. 1 shows an instrument utilizing the various aspects of the present invention in block diagram form.

Referring to FIG. 1, a temperature probe 11 contains at its tip a thermistor or some other temperature sensing transducer which, in use, is placed in contact with the body whose temperature is being measured. The most common use of such a probe is by placing it in the mouth of a human patient for measuring temperature. Since the same thermistor or other temperature sensing element may be used among many different patients, it is preferred to use disposable covers therefor. Since it is desired that the thermistor unit itself and any cover thereover not absorb heat which will slow the temperature measuring process, a thin plastic cover is stretched over the thermistor in a tight relationship therewith, thereby eliminating metal as a conductor. The probe and probe cover preferred for use with the circuit of FIG. 1 are described in more detail in a co-pending application by Martin Oudewaal, entitled, Clinical Thermometer Probe and Disposable Cover Therefor, Ser. No. 217,371, filed Jan. 12, 1972, now U.S. Pat. No. 3,822,593. In this co-pending application, a tubular probe cover is described for positive engagement over a rod having a thermistor at its end. The probe cover has a normally unstretched thin stretchable plastic membrane flat across its end. When the probe cover is positioned onto the probe, the membrane fits tightly about the thermistor unit to protect it but yet not significantly affect its heat transfer characteristics.

The remaining portion of the measuring and display circuit is packaged in a separate compact package and is designed to be hand-held so that it can be carried from patient to patient by a nurse. A flexible cable 13 connects the temperature sensor 11 with the electronic circuitry in the separate package. A plug 15 is connected to the end of the cord 13 and is removably connected to a jack 17. The plug 15 contains a bridge resistance circuit. The jack 17 is a part of the separate electronic package while the bridge in the plug 15 is associated with a particular temperature sensor and matched to its unique electrical characteristics.

A battery pack 19 is also removably attached to the carrying case for the electronic calculating and display circuits. A jack 21 makes the electrical connection between the batteries of the battery pack and the electronic circuit. A switch 23 within the carrying case for the electronic calculating and display circuits controls the power to such circuits. In the specific instrument to be described hereinafter with respect to the drawings, the battery pack 19 is connected to the instrument with three contacts in the jack 21 in order to provide +V voltage, a zero or ground potential voltage and a −V voltage supply. For the particular circuit components to be described hereinafter, +V is made +5 volts and −V is made a −5 volts with the use of two separate batteries within the battery pack 19. Throughout this description, specific electronic component values will be specified which all go together to make up a preferred operating instrument as an example of the present invention, but it will be understood, of course, that the various aspects of the present invention are not limited to any particular circuit values or voltages.

Referring again to FIG. 1, measuring and display circuits will first be described in general terms. A voltage input to the circuit in line 25 is representative of the temperature being sensed by the temperature probe 11. This voltage is converted from an analog signal to a digital signal by use of an integrator 27, a zero detector 29, a discharge switching circuit 31 and a control flip-flop 33. This circuit converts the analog voltage representation of temperature to a series of pulses whose widths are directly related to the temperature being measured. The widths of the pulses are measured by a circuit 35 that includes as its central element a free running counter 37. The circuit 35 drives a conventional display circuit 39 which preferably utilizes light emitting diodes and appropriate current driving circuitry therefor. Four digits are preferably displayed with a fixed decimal point just before the last digit so that the temperature is displayed to one-tenth of one degree. Accordingly, the accuracy of the instrument is made to be equal to or exceed one-tenth of one degree.

Figure 2:
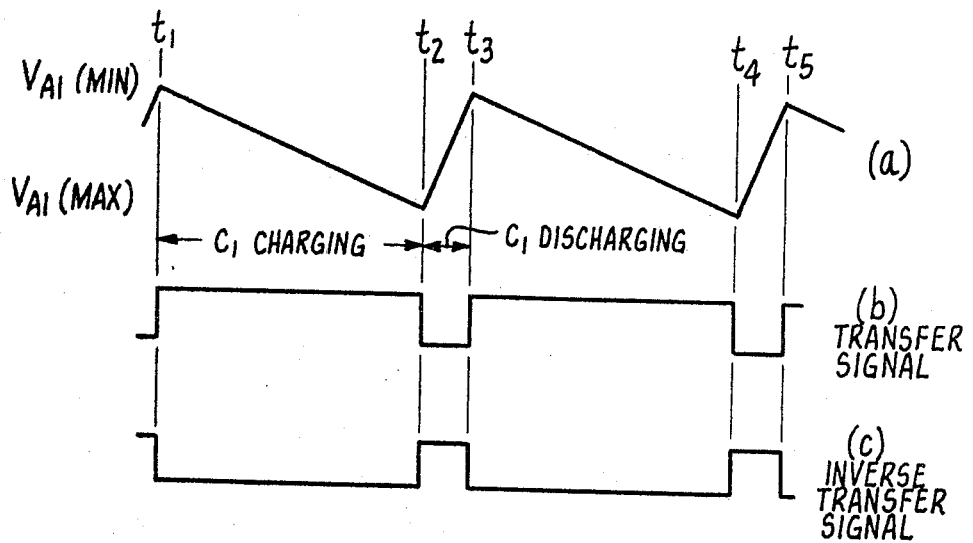
FIG. 2 is a representation of waveforms at various points in the circuit of FIG. 1.

A capacitor C1 is in the feedback path of the integrating amplifier 27 and is a primary element in the analog to digital converter of the circuit of FIG. 1. The changing voltage across capacitor C1 is illustrated in FIG. 2(a). The control flip-flop 33 controls the charging and discharging cycle of the capacitor C1. At time $t_1$ of FIG. 2(a), the zero detector 29 has sensed that the voltage across the capacitor C1 during its discharge has reached a predetermined threshold value. The zero detector 29 is connected to one side of the capacitor C1 and to the output of the integrating amplifier 27. The zero detector is set so that when the voltage across C1 decreases to a value $V_{41}$ (min.), a reset pulse is emitted at its output line 41. This pulse resets the control flip-flop 33. The control flip-flop 33 has a transfer signal output 43 and a signal at 45 that is the inverse of the transfer signal. These two signals are shown in FIGS. 2(b) and 2(c), respectively. The inverse transfer signal at 45 is connected with the discharge switch 31 which controls the charging and discharging cycle of the capacitor C1 and is connected to one side thereof. At the end of the discharge part of the cycle when the zero detector 29 emits a pulse at its output 41 ($t_1$, $t_3$, $t_5$ of FIG. 2(a)), the discharge switch 31 changes state since the inverse transfer signal at 45 from the control flip-flop changes state. The capacitor C1 then enters a charging part of the cycle.

From FIG. 2(a), it can be seen that at times $t_2$, $t_4$, etc., the capacitor C1 ends its charging cycle and the discharge switch 31 connects the capacitor C1 to be discharged. This is accomplished by setting the control flip-flop 33 by a signal in line 47 which occurs at periodic intervals. In the specific embodiment being described, this signal in the line 47 is an overflow of the free running counter 37. A four decade counter is preferred, and, therefore, an overflow signal is emitted therefrom in the line 47 each time the counter reaches a 10,000 count. The speed at which the counter 37 is counting determines the interval of the charging and discharging portions of the cycle for the capacitor C1. The speed of the counter 37 is, in turn, controlled by a clock circuit 49. It has been found convenient for the total time of charging and discharging of the capacitor C1 to be about 1 second. Therefore, the clock 49 preferably has a frequency of around 10,000 Hz. for a four decade counter 37.

To summarize, the capacitor C1 is connected to be charged by a voltage that is proportional to the temperature being sensed by the temperature sensor 11 after the control flip-flop 33 is reset by a pulse from the zero detector 29 (at times $t_1$, $t_3$, $t_5$, etc., of FIG. 2(a)). The capacitor C1 is caused to be discharged when the control flip-flop 33 is set by a counter overflow signal from the free running counter 37.

The time necessary for the capacitor C1 to discharge is related to the temperature being sensed by the temperature sensor 11. The length of the capacitor C1 discharge time is observed by the transfer signal 43 of the control flip-flop 33. At the beginning of each discharge portion of the cycle, the counter 37 is beginning to count from zero. The count in the counter at the end of the discharge cycle (at $t_1$, $t_3$, $t_5$, etc. of FIG. 2(a)) is observed by a latch circiut 51 within the circuit 25 which also remembers it. The latching circuit 51 is directed by a latching signal in line 53 to read the count of the counter 37 at the end of the capacitor discharge cycle. The latching signal 53 is derived through an inhibit switch 55 from the transfer signal 43 at the output of the control flip-flop 33. When the control flip-flop 33 is reset by a pulse, from the zero detector 29 at times $t_1$, $t_3$, $t_5$, etc., the change in state of the control flip-flop 33 causes the latching circuit 51 to read and remember the count of the counter 37 at that instant.

The count retained in the latching circuit 51 is then displayed on the display circuit 39. In order to conserve battery power, a multiplexing circuit 55 is interposed between the latching circuit 51 and the display circuit 39 to sample the count retained in the latching circuit so that the light emitting diodes or other indicating devices in the display circuit 39 will not be driven continuously but rather will be cycled at a rate fast enough not to be detected by the human eye. This sampling rate is determined by the frequency of a clock circuit 57 that is connected to the multiplexer 55. The clock 57 is set around 60 Hz.

Thus, with the circuit described so far with respect to FIG. 1, the temperature sensed by the temperature sensor 11 will be displayed on the indicating devices of the display circuit 39 once each second. If the temperature is changing, the temperature indicated at the display circuit 39 will also change each second. Therefore, when a temperature measurement is being made, the temperature displayed will change gradually until it reaches a steady state value at which time the operator knows that an indication of the temperature of the body is being given. This mode of operation of the device is referred herein as its "monitoring mode." In order to speed up the temperature measuring process so that the final equilibrium temperature is displayed faster than it is when operating in the "monitoring mode," additional forecasting and locking circuits, as shown in FIG. 1, are provided so that the device may be operated in what is referred herein as its "temperature mode" wherein the ultimate equilibrium temperature between the thermistor and the body being measured is forecasted and displayed prior to its body being reached. Before describing the forecasting and locking circuits, however, a detailed description of the measuring and display circuits is given.

Figure 3:
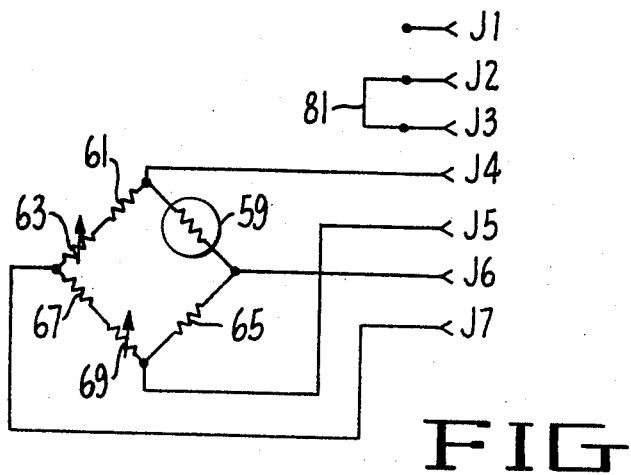
FIGS. 3 and 4 show thermistor plug circuits for obtaining degrees Fahrenheit and degrees Centigrade readings, respectively, when connected to the circuit of FIG. 1.

Referring to FIG. 3, the bridge circuit connecting a thermistor 59 to the measuring and display circuits is shown. The thermistor 59 is contained in the temperature sensing probe 11 while the remaining components shown in FIG. 3 are contained in the plug 15 of FIG. 1. The thermistor 59 is electrically connected between pins J4 and J6 of the plug 15 for interconnection with associated pins of the jack 17. An adjacent leg of the bridge circuit of FIG. 3 includes series resistors 61 and 63 connected between pins J4 and J7 of th plug 15. The resistor 63 is made adjustable in order to match the bridge circuit to a particular thermistor 59 to make the voltage signal output between pins J4 and J5, substantially linear with the temperature being measured by the thermistor 59. When connected with the rest of the circuit, the bridge of FIG. 3 has its pin J6 connected at ground potential and its pin J7 connected to the voltage −V voltage source.

The other leg of the bridge circuit immediately adjacent the thermistor 59 contains a resistor 65 that is connected between pins J5 and J6. The remaining leg of the bridge circuit contains series 67 and 69 connected between pins J5 and J7. The resistors 65, 57 and 69 comprise a voltage divider which serves as the reference leg of the bridge circuit. Adjustment of the variable resistance 69 allows adjusting the rate of change of voltage output between pins J4 and J5 for a given change in temperature sensed by the thermistor 59. The remaining pins of the connecting jack, J1, J2, and J3 serve a purpose of controlling a mode of operation of the electronic circuit and is explained hereinafter with respect to FIG. 5.

In the specific form of the measuring device being described herein, the thermistor 59 is manufactured by the Fenwal Electric Company of Framingham, Massachusetts under their part number UUA 41J1 with 10,000 ohms nominal resistance. The resistance of the thermistor, of course, changes with temperature and in order to make the voltage output at pins J4 and J5 of the bridge circuit of FIG. 3 have desired characteristics, the resistors in the other legs of the bridge circuit of FIG. 3 are as follows.

| | |
|---|---|
| Total, resistors 61 and 63: | 5260 ohms |
| Resistor 65: | 4990 ohms |
| Total, resistors 67 and 69: | 4938 ohms (F.) |
| Total, resistors 67′ and 69′ (FIG. 4): | 6654 ohms (C.) |

Figure 5:
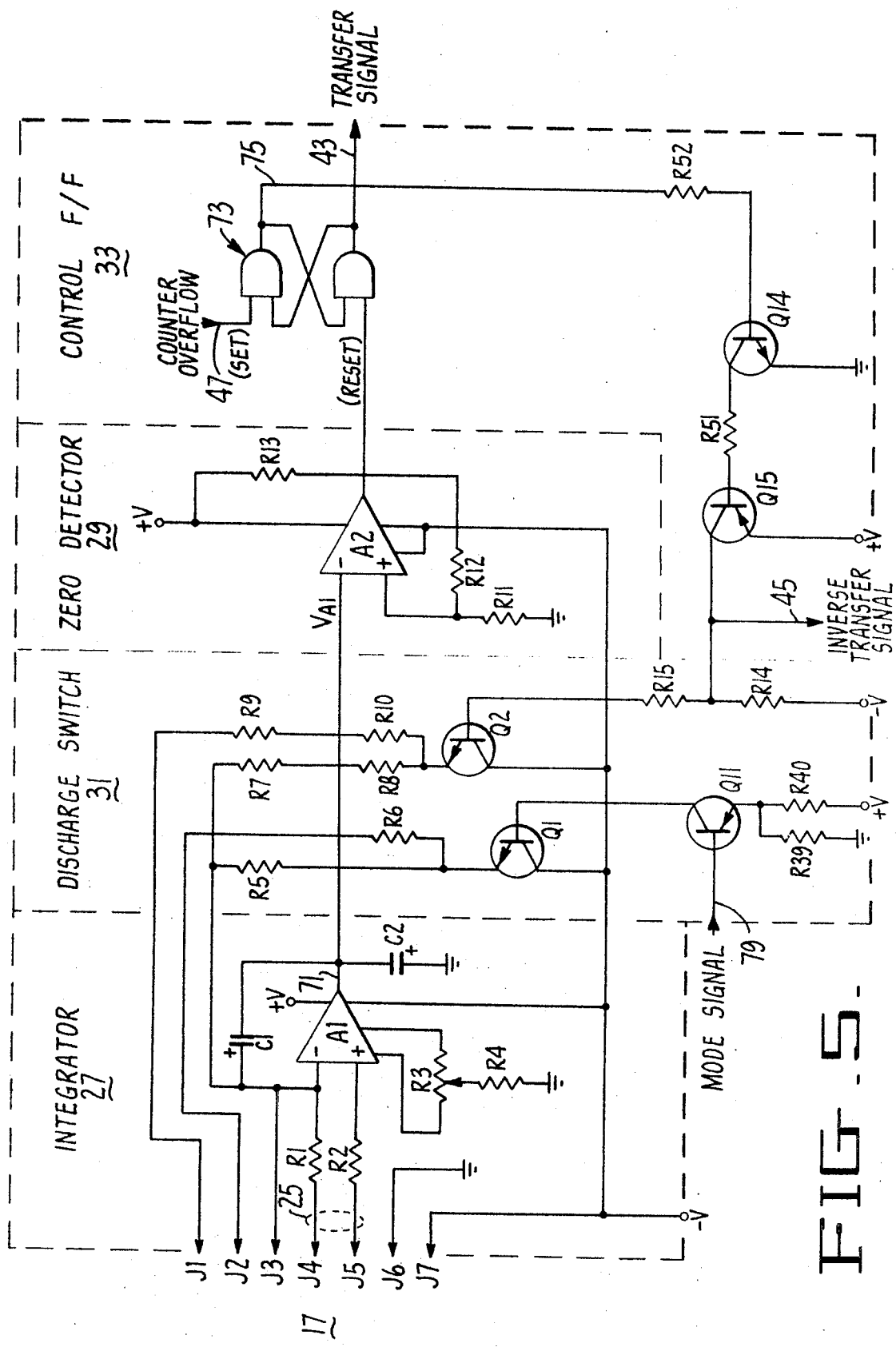
FIG. 5 shows a detailed circuit diagram of the jack to which the thermistor bridge plug is connected, the integrator, the zero detector, the control flip-flop and the discharge switch blocks of the circuit of FIG. 1.

Referring to FIG. 5, the analog-to-digital converter described above with respect to the measuring and display circuits of FIG. 1 is described in more detail. The jack 17 has pins J1-J7 on a case enclosing the electronic and display instrument which corresponds to similar pins described with respect to FIG. 3 for the bridge circuit. Pins J6 and J7 provide the necessary voltage to the thermistor and the bridge circuit of FIG. 3. Pins J4 and J5 of FIG. 5 receive voltage from the bridge circuit of FIG. 3 that is proportional to the temperature of the thermistor in the probe 11. Pin J4 is connected through a resistor R1 to an inverting input of a differential operational amplifier. A1. Similarly, pin J5 is connected through a resistor R2 to a non-inverting input of the differential operational amplifier A1. Suitable amplifiers for use as amplifier A1 in FIG. 5 are commercially available and well-known. The amplifier A1 is appropriately connected to both +V and −V voltage supply. A variable resistance R3 and a fixed series resistance R4 are connected appropriately between the amplifier and ground for nulling of input offset voltage.

An output 71 of amplifier A1 is fed back to the inverting input through the integrating capacitor C1. The output 71 is also connected to a second capacitor C2 which has its other side connected to ground. It may be noted that the non-inverting input of the amplifier A1, connected to pin J5 of the jack 17, receives a constant voltage regardless of the temperature being measured because it is supplied by a voltage divider made up of resistors 65, 67 and 69 in the bridge circuit of FIG. 3. The variable resistance of the thermistor 59 determines the voltage applied to the inverting input of the amplifier A1 through the pin J4 of the jack 17. The amplifier A1 operates by always trying to keep its inverting input voltage equal to the fixed non-inverting input voltage by feedback through the capacitor C1. Therefore, charging current through the capacitor C1 is proportional to the voltage applied at pin J4 and J5 which in turn is proportional to the temperature being measured by the thermistor 59. After a period charging time, therefore, the voltage across the capacitor C1 is then proportional to the temperature being measured and it is this capacitor voltage that is utilized in obtaining a digital representation of the measured temperature.

As the capacitor C1 is charging, the voltage output $V_{A1}$ at the output 71 of the amplifier A1 is going more and more negative in the specific circuit shown in FIG. 5. This voltage output 71 is connected to an inverting input of a second amplifier A2 which acts to constantly compare this voltage with a fixed voltage presented to a non-inverting input of the amplifier A2. The fixed voltage at the non-inverting input of the comparitor amplifier A2 is made to be about 0 volts or slightly positive and thereby determines the minimum charge voltage that is held by the capacitor C1, which is denoted in FIG. 2(a) as $V_{A1}$ (min.). When the capacitor C1 is discharging, by a means described hereinafter, the voltage $V_{A1}$ is moving from a maximum negative value to the threshold voltage at the non-inverting input of the amplifier A2. When the voltage $V_{A1}$ reaches this threshold, the output 41 of the amplifier A2 goes sharply negative to generate a reset pulse.

The reference voltage at the non-inverting input of the amplifier A2 is provided by a voltage divider consisting of series resistors R11, R12, and R13 connected between ground potential and +V. The non-inverting input is connected between resistors R11 and R12 and, since the output of amplifier A2 is normally high, the non-inverting input of the amplifier A2 is kept slightly positive. When the output 41 of the amplifier A2 is switching negative, the voltage at the non-inverting input also switches slightly negative. This increase the differential input voltage of amplifier A2 and, as a result, a sharp clean pulse is obtained at the output 41.

A conventional flip-flop circuit 73 is constructed of available components. The circuit is set into one of its states by a counter overflow signal 47 at periodic intervals as described above with respect to FIG. 1. The circuit is switched to its second stable state by a reset pulse in the line 41 from the comparitor amplifier A2 at the end of the discharge cycle of capacitor C1. The transfer signal voltage output at 43 is used as a basis for displaying the temperature being measured since the time that the flip-flop 73 remains set by the counter overflow signal determines the magnitude of the temperature being measured. An inverse transfer signal is developed from a second output 75 of the flip-flop circuit 73. The output 75 has a resistor 52 connected in series with it and the base of a transistor Q14. The emitter of the transistor Q14 is connected at ground potential and its collector is connected through a resistor R51 to another transistor Q15 which has its emitter held at +V volts. The collector of Q15 is connected with the line 45 at which the inverse transfer signal is derived. This signal is used to control certain parts of the forecasting and locking circuits to be described hereinafter, and additionally is utilized to control the discharging of the capacitor C1.

A transistor Q2 has its collector connected to −V volts and its emitter connected to the inverting input of the amplifier A1 through series resistors R7 and R8. Thus, when the transistor Q2 is switched to its low resistance state, capacitor C1 is discharged to the −V volt source through series resistors R7 and R8. The transistor Q2 is switched to its low resistance state when the flip-flop 73 is set by the periodic counter overflow signal at its input 47. The transistor Q2 is so controlled by its base being connected to the collector of the transistor Q15. In order to provide a bias to the base of transistor Q2, the voltage divider consisting of series resistors R14 and R15 is provided with one end of the voltage divider connected to the −V voltage source and the other end to the base of the transistor Q2. The collector of Q15 is connected to the junction between the resistors R14 and R15. Two resistors R7 and R8 are used, instead of one, to make it easier to accurately control the total resistance since one of these resistors may be made large and the other one carefully controlled within narrow tolerances so that the two add up to the desired resistance.

When the transistor Q2 is switched by the flip-flop 73 when it receives a set signal at its input 47, the capacitor C1 is discharged but it will be noted that the charging circuits are not affected. While the capacitor C1 is being discharged, the voltage $V_{A1}$ is gradually increasing until it reaches the threshold voltage applied to the non-inverting input of the amplifier A2, a pulsed is developed at the output 41 of the amplifier A2 which resets the flip-flop 73 and results in turning off the transistor Q2. The discharge of the capacitor C1 then ceases.

The length of time during which C1 discharges to the threshold voltage at the non-inverting input of amplifier A2 is determined by the total value of the resistors R7 and R8. It is a desirable feature of the instrument described herein that it may be used to measure temperature directly on either the Fahrenheit scale or the Centigrade scale. If the display is to be made in degrees Centigrade, the total resistance discharging the capacitor C1 should be reduced in order to reduce the discharge time and thus the reading on the display unit 39 for a given temperature. Therefore, series resistors R9 and R10 are provided for parallel connection with the series resistors R7 and R8 in order to reduce the capacitor C1 discharge path resistance. Rather than having a separate switch on the device for switching in resistors R9 and R10 when a reading in Centigrade degrees is desired, pin J1 of the jack 17 is connected to one end of these series resistors while the other end is connected to the emitter of the transistor Q2.

Figure 4:
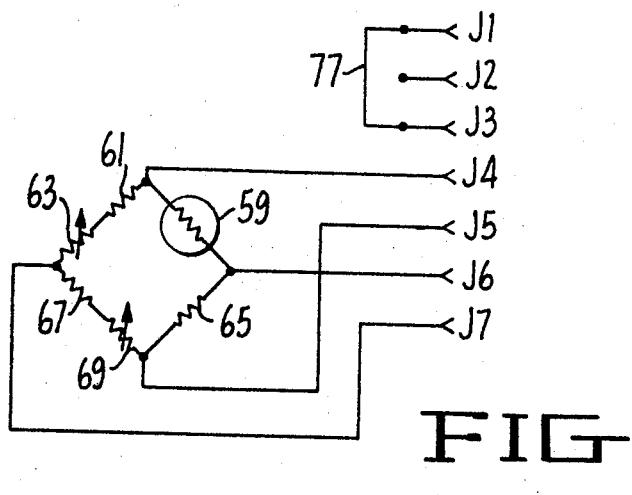

Separate plugs 15 are then provided for operation in degrees Fahrenheit or degrees Centigrade. Referring to FIG. 3, J1 is shown to be unconnected in the plug 15 and thus the resistors R9 and R10 are not in the circuit. This is the configuration for readings being taken in degrees Fahrenheit. Referring to FIG. 4, connections in the plug 15 are shown for obtaining readings in degrees Centigrade. The pin J3, as can be seen from FIG. 5, is connected to the inverting input of the amplifier A1 and thus the jumper 77 connects the resistors R9 and R10 into the circuit to lower the discharge resistance path of the capacitor C1. Accordingly, separate temperature sensor and plug assemblies are provided for Centigrade measurement and for Fahrenheit measurements.

Yet another parallel current path is provided in FIG. 5 for discharge of the capacitor C1 which includes resistor R5 and a transistor Q1. The collector of the transistor Q1 is connected to −V voltage supply while the resistor R5 is connected in series with the emitter of the transistor Q1 to the inverting input of the amplifier A1. The transistor Q1 is switched by a mode signal which is fed to the circuit through a line 79. The line 79 is connected with the base of a transistor Q11 and its collector drives the base of the transistor Q1. The transistor Q11 is connected at its emitter to the +V voltage supply through R40 and through a parallel path to ground through R39. In the "monitoring mode" the mode signal voltage level at the line 79 is low in order to switch on both the transistor Q11 and the transistor Q1. This places the resistor R5 in the discharge path of the capacitor C1.

The mode signal presented at the line 79 need have only one other value, a high one that turns off transistor Q11 and thus turns off the transistor Q1 to take the resistor R5 out of the discharge path of the capacitor C1. This high mode signal level at the line 79 results in increasing the time necessary for the capacitor C1 to discharge since its discharge path resistance is raised by taking R5 out of the circuit. As is explained more fully hereinafter, this mode of operation, referred to as the "temperature mode," predicts a final temperature in advance of its being reached so it is desired that the display receive a larger value than that developed by the discharge of the capacitor C1 while operating in the "monitoring mode." The high or low mode signal applied to the line 79 is generated by a mode control switch. In order to keep the instrument less complex, an electronic switch is provided instead of a mechanical switch, as described hereinafter with respect to FIG. 9.

It will be noted that since the collectors of transistors Q1 and Q2 are connected to the −V supply, the discharge path of the capacitor C1 is to the −V supply. This is the same voltage supply to which the bridge circuits of FIGS. 3 and 4 are connected. Thus the measurement of discharge time of C1 is insensitive to −V voltage supply variations.

The resistance of the discharge path through the transistor Q1 must also be adjusted for degrees Fahrenheit or degrees Centigrade readings. Therefore, the plug 15 provided with a pin J2 which communicates with one side of a resistor R6, the other side of the resistor R6 being connected to the emitter of the transistor Q1. When using the instrument for displaying readings in degrees Fahrenheit, the pin J2 of the plug 15 (FIG. 3) is connected by a jumper wire 81 to the pin J3. This has the result of parallelling the resistor R6 with the resistor R5. When a plug 15 made for displaying temperature in degrees Centigrade is used, the pin J2 is left unconnected (FIG. 4) and thus the resistor R6 is not in the circuit.

When the circuit is operating in its "monitoring mode," the inhibit switch 55 of FIG. 1 connects a transfer signal in the line 43 directly to the line 53 and into the latching circuit 51, as explained hereinabove. The various circuit blocks shown within the dotted outline of a digital circuit 35 is commercially available on a single integrated circuit chip from Mostek, Inc. of Carlton, Texas. The frequency of the clock 49 is adjusted by an external capacitor connection to this commercially available circuit chip. Similarly, the frequency of the clock 57 is adjusted by a separate capacitor external to the circuit chip.

Particular component designations used in the circuit illustrated in FIG. 5 may be as follows:

R1 — 68.1 K ohms
R2 — 10 K ohms
R3 — 25 K ohms
R4 — 47 K ohms
R5 — 22 M ohms
R6 — 150 M ohms
R7 + R8 — 16.075 K ohms
R9 + R10 — 30.4 K ohms
R11 — 100 ohms
R12 — 100 K ohms
R13 — 47 K ohms
R14 — 47 K ohms
R15 — 5.1 K ohms
R39 — 5.1 K ohms
R40 — 10 K ohms
R51 — 82 K ohms
R52 — 47 K ohms
C1 — 6.8 uF
C2 — 1.0 uF
Q1 — 2 N 4437
Q2 — 2 N 4437
Q11 — 2 N 4248
Q14 — 2 N 3565
Q15 — 2 N 4248
A1 — 741
A2 — 311

Figure 6:
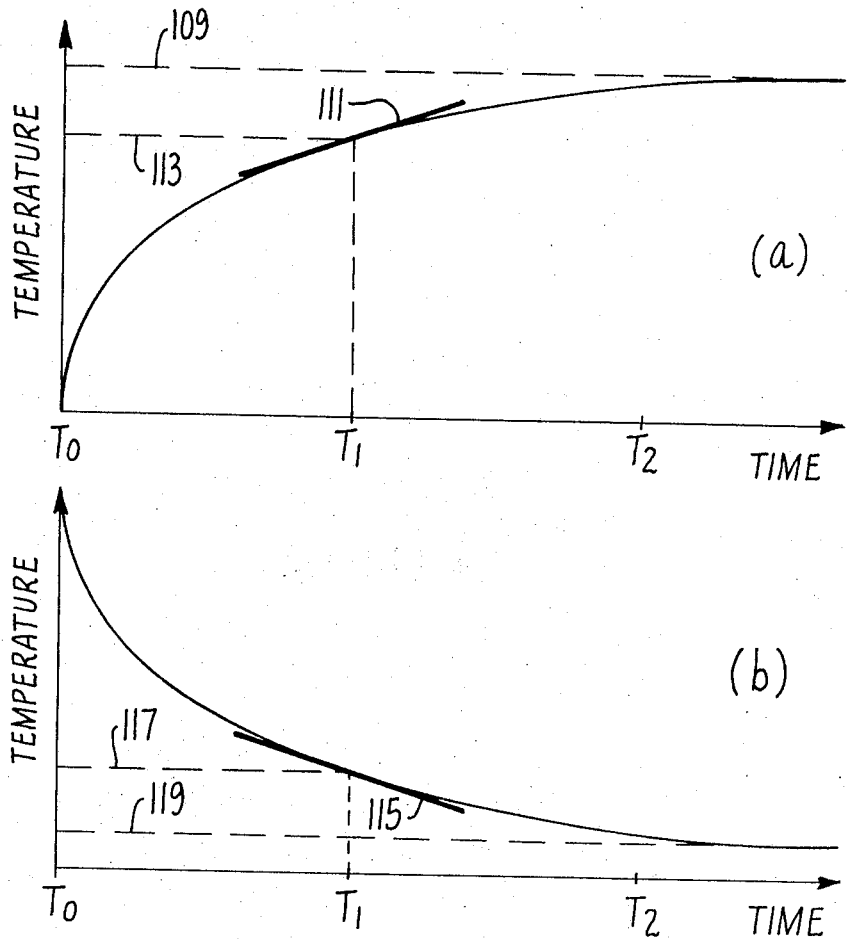
FIG. 6 shows yet additional characteristic curves of the circuit of FIG. 1.

Referring again to FIG. 1, the forecasting and locking circuits for operating the thermometer in its "temperature mode" are illustrated generally by block diagrams. A signal amplifier 101 has presented at its input the analog voltage signal developed at the line 25 by the temperature sensor 11. An output 103 of the amplifier 101 drives parallel positive sensing and negative sensing circuits 105 and 107, respectively, which determine when the rate of change of the temperature of the thermistor unit falls below a predetermined value. This may be illustrated with respect to FIG. 6 wherein FIG. 6(a) indicates a probable temperature rise curve of a thermistor that is initially at a lower temperature than the temperature of the body to be measured. As heat is transferred from the body to the thermistor, its temperature as shown in FIG. 6(a) to rise to an equilibrium level 109 which is the temperature of the body being measured. The technique used in the clinical thermometer described is to estimate at time $T_1$ the ultimate temperature to be reached at time $T_2$ without having to wait for the thermistor to reach an equilibrium temperature with the body. Therefore, the rate of change of the curve of FIG. 6(a) is tested periodically. For instance, at a time $T_1$, a slope 111 of the curve may be determined to first fall below a certain predetermined slope. Since the temperature rise characteristics of the thermistor are predictable, a temperature value 113 at time $T_1$ may be used to determine the final temperature 109 by adding on the difference therebetween. In this way, time is saved in each temperature measurement.

Similarly, the negative sensing circuit 107 is utilized to monitor the slope of the temperature change of a thermistor that originally is higher in temperature than that of the body to be measured. When a slope 115 of the thermistor temperature curve first falls below a predetermined value at a time $T_1$, the temperature 117 at the time has a fixed amount added thereto to measure at an early instant the temperature 119 of the body to which the thermistor will descend at time $T_2$.

Both the positive and negative sensing circuits 105 and 107 sample the amplified signal 103 that is proportional to the temperature of the thermistor of the probe 11. The signal at 103 is sampled once each charge and discharge cycle of the capacitor C1. This is accomplished by connection with the inverse transfer line 45 of the control flip-flop 33. During a period of time coincident with the portion of each cycle wherein the capacitor C1 is discharging, positive and negative sensing circuits 105 and 107 each are updated to store the value of the amplified signal at the line 103 during that instant. During the charging portion of the capacitor cycle, the inverse transfer function from the control flip-flop 33 switches the positive and negative sensing circuits 105 and 107 to compare the changing voltage level at the output 103 which occurs as the temperature of the thermistor changes. If the change in the voltage at 103 during the charging cycle of the capacitor C1 is greater than a predetermined incremental change value set into the circuits, a reset pulse is developed in line 121 from the appropriate positive or negative sensing circuit 105 or 107, respectively, depending on whether the temperature of the thermistor is increasing or declining. When the change noted during a cycle of operation is less than the predetermined value, no reset pulse is developed in the line 121. Only one of the positive or negative sensing circuits 105 or 107 will develop a reset pulse in the line 121 depending on whether the temperature is increasing or decreasing.

A pulse generator 123 develops a clock pulse each cycle in a line 125 which operates to advance a counter 127. The pulse generator 123 is keyed by a signal from the positive sensing circuit 105 through a line 129 so that one clock pulse occurs each charge and discharge cycle. An output 131 of the counter circuit 127 moves from a first state to a second state after two clock pulses in the line 125 unless the counter has been reset by a pulse 121. The result is that the output 131 of the counter 127 changes state after two clock pulses from the pulse generator 123 after either the positive or negative sensing circuits 105 or 107 have noted a voltage change that is less than the predetermined slope at which a temperature measurement is taken. When the output 131 changes state, a blanking/transfer inhibit circuit 133 responds by changing its output level 135 to remove a blanking from the display circuit 39 and thus permit a display to take place. Also, the output level change 135 causes the inhibit switch 55 to stop the transfer signal 43 from reaching the latch 51 via the line 53.

A switching circuit 137 develops either one of two voltages in its output 79. The lower output voltage causes the thermometer to operate in its "monitoring mode." The higher output voltage causes the thermometer to operate in its "temperature mode," wherein the blanking/transfer inhibit circuit 133 directs the display circuit 39 and the inhibit switch 55 not to display a temperature value until the slope of the changing curve of the thermistor falls below a predetermined value in the manner described above. In the "temperature mode," the digital display of the display circuit 39 will show only a single temperature for every temperature measurement. This temperature display is the temperature of the body being measured that is forecasted prior to the thermistor reaching that body temperature and being in equilibrium therewith. The temperature added onto that actually measured prior to the equilibrium point being reached is accomplished by switching transistor Q1 to its off (or high resistance state) so that the capacitor C1 will take longer to discharge and thus register a higher reading on a display 39 than is actually sensed at the time $T_1$.

Figure 8:
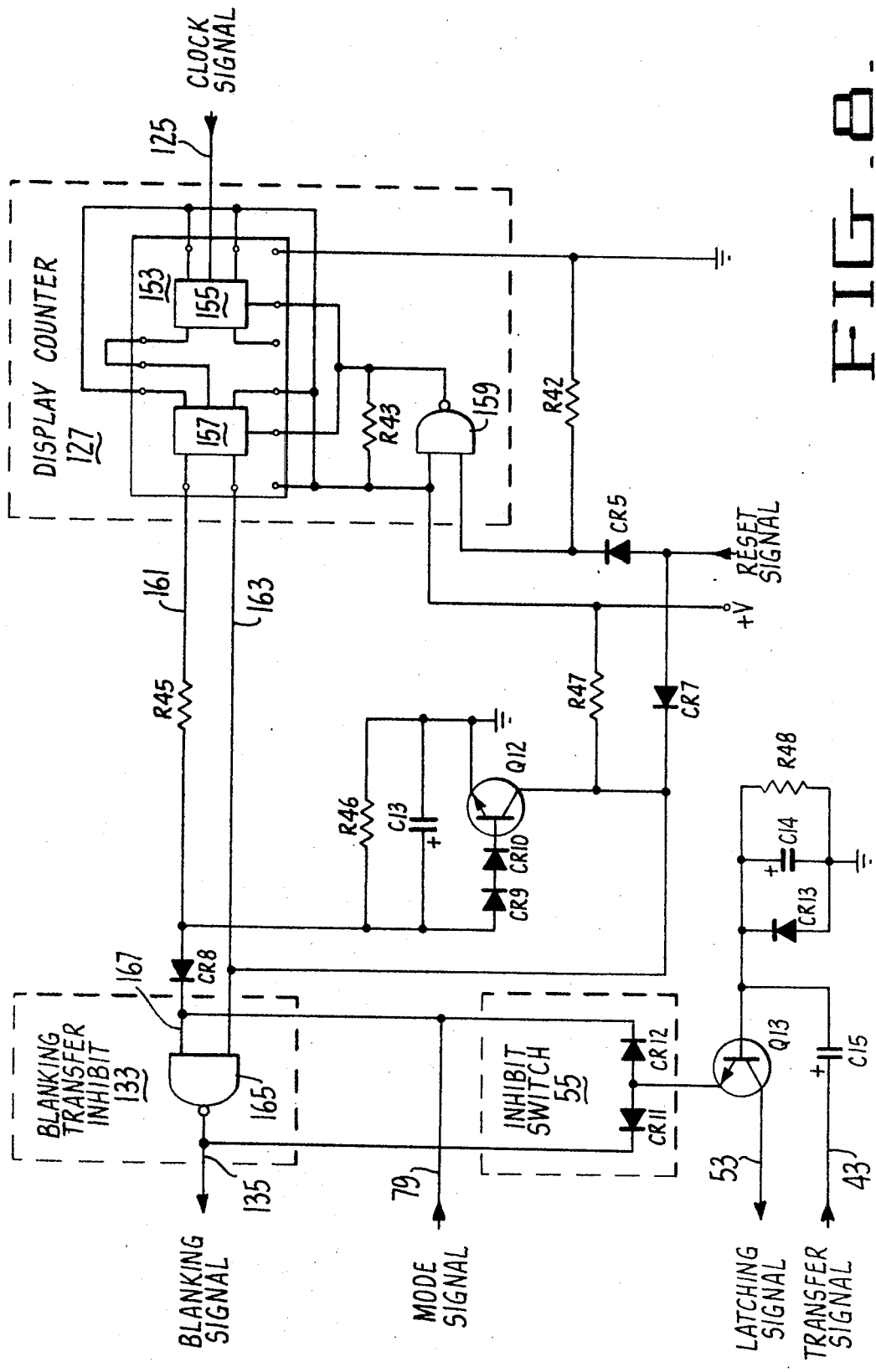
FIG. 8 is a detailed circuit diagram of the display binary counter, the blanking/transfer inhibit circuit, the inhibit switch blocks and associated circuitry of FIG. 1.

Detailed circuits for the forecasting and locking functions described generally with respect to FIG. 1, are given in FIGS. 7 and 8. Referring to FIG. 7, a differential operational amplifier A3 has its non-inverting input connected through a resistor R16 to pin J4 of the jack 17. Pin J4, as described hereinabove, contains a voltage that varies with the temperature being sensed by a thermistor of the temperature probe 11. The output 103 of the amplifier A3 is fed back to its non-inverting input through parallel combination of a resistor R17 and a capacitor C3. These elements fix the amplification of the amplifier A3 within a close tolerance. A voltage divider made up of series resistors R18 and R19 is connected between the −V voltage source and ground potential. The non-inverting input of amplifier A3 is connected at the junction of these two series resistors and thus maintains a fixed bias. The resistors R18 and R19 are chosen so that the bias to the amplifier A3 is such that there is no output at 103 until the temperature being sensed by the thermistor approaches the region of interest, namely human or animal temperature.

The output 103 is connected directly to non-inverting inputs of differential operational amplifiers A4 (negative sensing circuit) and A5 (positive sensing circuit). The inverting inputs of amplifiers of A4 and A5 are connected, respectively, to the emitter of transistors Q5 and Q6 while the collectors of these transistors are connected to the +V voltage source. The transistors Q5 and Q6 remain in an "on" condition and are provided to increase the input impedance of the amplifiers A4 and A5. However, if amplifiers having sufficiently high impedance are chosen, the transistors Q5 and Q6 may be omitted and the circuits connected with their bases may be respectively connected to the inverting inputs of amplifiers A4 and A5.

Referring first to the negative sensing circuit illustrated in FIG. 7, the amplifier A4 has a feedback loop from its output through an MOS device Q7 and a resistor R26 in series to the inverting input of the amplifier A4 through the transistor Q5 from its base. Also connected to the base of transistor Q5 is the emitter of a transistor Q4, its collector being connected through a resistor R22 and Zener diode CR1 to the output 103 of the signal amplifier A3. The base of the transistor Q4 and the gate of the MOS device Q7 are connected, respectively, through series resistors R50 and R49 to the line 45 which carries the inverse transfer signal developed by the flip-flop 73 of FIG. 5. A capacitor C5 is connected to the side of the resistor R26 in the feedback loop of the amplifier A4 that is nearest the output of the amplifier. The capacitor C5 serves to store a voltage proportional to the thermistor temperature once each cycle of the circuit operation and serves as a basis for comparison of the changing characteristics of the thermistor temperature.

When the integrating capacitor C1 is being discharged by the control flip-flop 73 being in its proper state, the inverse transfer signal in line 45 causes the transistor Q4 and MOS device Q7 to switch into its low resistance "on" state. This creates a current path from +V through R21, the resistor R22, and transistor Q4, the feedback resistor R26 and the MOS device Q7. The resistor R26 is made to be of a very low value, in the order of something less than 50 ohms. Therefore, the non-inverting input of the amplifier A4 will have substantially the same voltage presented to it as its output. The Zener diode CR1 maintains the voltage at its output point 141 a constant number of volts different from the voltage to the non-inverting input of the amplifier A4. As a result, the series current through the resistor R22, the transistor Q4 and the feedback resistor R26 is fixed by this voltage difference created by the Zener diode CR1. Accordingly, the voltage drop in the feedback resistor R26 is a constant for all values of voltage output 103 of the amplifier A3. Accordingly, the capacitor C5 is charged to a voltage that is a fixed number of millivolts lower than the voltage applied to the non-inverting input of the amplifier A4. In the specific instrument being described herein, this voltage is desirably 10 millivolts.

Therefore, the capacitor C5 charges to a voltage that is a fixed amount less than the voltage at the non-inverting input of the amplifier A4 during the period of time that the circuit is in its mode for discharging the integrating capacitor C1. When the flip-flop 73 is reset by a pulse output of the amplifier A2, the inverse transfer signal in the line 45 changes level and turns off the transistor Q4 and the MOS device Q7. In this condition, the amplifier A4 is operating as an open loop amplifier with the voltage that has been developed across the capacitor C5 being presented to the inverting input of the amplifier A4. The non-inverting input of the amplifier A4 remains connected to the output 103 of the signal amplifier A3. Thus, the output of the amplifier A4 will go to a very high value immediately after Q4 and Q7 are switched off. If the voltage at the non-inverting input of the amplifier A4 decreases during the charging cycle of integrating amplifier C1 to a voltage that is less than the voltage presented to the inverting input by the capacitor C5, the output of amplifier A4 will switch to a very much negative voltage. That is, in the specific case being described herein, since the inverting input has a voltage applied thereto by the capacitor C5 that is 10 millivolts less than the voltage at the non-inverting input of the amplifier A4 while the capacitor C5 is being charged, the amplifier A4 will emit a large negative voltage at its output when the voltage at the non-inverting input of the amplifier A4 decreases by more than 10 millivolts during the charging cycle of the integrating capacitor C1. At the end of the charging cycle, the inverse transfer signal at the line 45 causes the transistor Q4 and the MOS device Q7 to switch to their "on" state again, and the capacitor C5 is updated to carry a voltage equal to any new voltage at the non-inverting input of the amplifier A4 that may exist at that time.

The output of the amplifier A4 is delivered to an AND gate 143 by a line 145 that is connected with the collector of a transistor Q8 while the emitter of the transistor is connected with the output of the amplifier A4. The base of the transistor Q8 is biased by a series resistor R25 and a diode CR2 that are connected to the non-inverting input of the amplifier A4. A second input line 147 to the AND gate 143 is connected to the +V voltage supply. A resistor R44 is connected between the input line 147 of the AND gate 143 and its output line 149. A capacitor C9 and a resistor R41 are connected in parallel across the input lines 145 and 147. A diode CR6 assures that only positive voltage swings of the amplifier A4 are fed into the reset signal 121.

The positive sensing circuit 105 is very similar in operation to the negative sensing circuit 107. A storage capacitor C4, which is the counterpart of the capacitor C5 described in the negative sensing circuit, is connected to store a voltage that is a fixed amount above the voltage at the noninverting non-inverting of the amplifier A5, this amount also chosen to be 10 millivolts in the specific example described herein. When the inverse transfer signal 45 is in a condition to turn on the transistor Q3 through the series resistor R20 connected to its base and the MOS device Q9 through a series resistor R27 connected to its gate, a series current path is created from +V through R21, R23, transistor Q3, R24 and Q9 to the output of amplifier A5. The amplifier A5 has a feedback loop with very little resistance therein from its output to its inverting input through the base and emitter of transistor Q6. The output of the amplifier A5 will then have a voltage that is substantially the same as that applied to the non-inverting input of the amplifier since the amplifier functions to equalize any voltage differences between the inverting and non-inverting inputs thereof. Since the point 141 is a fixed number of volts different from that applied to the non-inverting input of the amplifier A5, a fixed current will flow through a series circuit consisting of a resistor R23, the transistor Q3, a series resistor R24 and the MOS device Q9. The resistor R24 connected between the base of the transistor Q6 and emitter of the transistor Q3 is of a very low value for developing the desired voltage drop thereacross. The capacitor C4 is connected to that end of the resistor R24 that is also connected with the emitter of the transistor Q3.

Therefore, during the portion of the cycle wherein the integrating capacitor C1 is being discharged, the capacitor C4 of FIG. 7 is being charged to a voltage that is 10 millivolts greater than the voltage applied to the non-inverting input of the amplifier A5. During the portion of the operating cycle of the circuit wherein the integrating capacitor C1 is charging, the inverse transfer signal at the line 45 will be such as to turn off the transistor Q3 and the MOS device Q9 which places the amplifier A5 in the condition of operating as an open loop amplifier with the voltage stored in the capacitor C4 being impressed upon its inverting input. If the voltage applied to the non-inverting input increases to a value higher than the voltage at the inverting input of the amplifier A5, its output will swing very high and thus will be passed through a line 151 to the reset signal line 121. Therefore, a reset signal will be generated in the line 121 if the change in voltage at the output 103 of the signal amplifier 101 is greater than a fixed value, 10 millivolts herein, during a fixed period of time, about one second herein. A reset signal is developed in the line 121 when the voltage at the output 103 is moving either upward or downward corresponding to an upward or downward movement of the temperature of the thermistor in temperature probe 11. When the incremental change during a cycle of operation is less than the fixed voltage value, 10 millivolts herein, no reset signal is generated in the line 121 and a temperature is caused to be displayed in the display circuit 39, in a manner to be discussed hereinafter.

A clock pulse generator for advancing the display binary counter 127 is shown in detail in FIG. 7 wherein the output of a comparitor A6 is connected with the clock signal line 125. The clock pulse generator 123 is designed to emit a clock signal in the line 125 that has a sharp trailing edge on a positive going pulse. This type of pulse is necessary to increment the display counter 127 of the type to be described hereinafter with respect to FIG. 8. The output of the amplifier A5 is connected through a capacitor C8 to the non-inverting input of the amplifier A6 of the clock pulse generator 123. The inverting input of the amplifier A6 is held at ground potential. A small negative bias is applied to the non-inverting input of the amplifier A6 by connecting its input to the junction of a series diode CR3 and resistor R28. The other side of the diode CR3 is connected to ground potential and the other side of resistor R28 is connected to the −V voltage source.

When a positive transient of sufficient rise time occurs at the output of the amplifier A5, the capacitor C8 will differentiate this signal and the non-inverting input of the amplifier A6 will be forced above ground level. Since the non-inverting input is thus higher than the inverting input potential, a positive pulse is created at the output of the amplifier A6. This occurs during that part of the cycle wherein the integrating capacitor C1 is discharging.

Referring to FIG. 8, it is seen that the clock signal line 125 is applied to a circuit chip 153 of the display counter 127. The circuit chip 153 is of a commercially available form that includes separate flip-flops 155 and 157 that are externally wired in the manner shown. The flip-flop circuit 155 receives the clock pulse from the line 125 and is switched on every such clock pulse. The second flip-flop 157 is connected with the first flip-flop 155 in a manner to be switched on every second clock pulse into the line 125. Both of the flip-flops 155 and 157 receive a reset signal from the output of an AND gate 159. One input of the AND gate 159 is connected to the reset signal line 121 through a diode CR5 which provides an additional threshold to driving the counter.

A line output 161 from the display counter 127 is normally at a low potential until two successive clock signals from the line 125 have been received by the counter and have been allowed to increment the counter. Conversely, the output line 163 of the display counter 127 normally at a high potential until the counter has been allowed to increment by two successive clock pulses from the line 125 at which time the output line 163 switches to its low voltage second state. Therefore, the normal state of the voltages at the output lines 161 and 163 is maintained by reset signals from the negative sensing and positive sensing circuits through a reset signal line 121. It is seen then that the voltages at the output lines 161 and 163 switch out of their normal state when two successive clock signals have been received in the line 125 without a reset signal having been provided in the line 121. This is the situation wherein the incremental change of the voltage output 103 of the signal amplifier A3 of FIG. 7 is less than 10 millivolts, in the specific instrument being described herein, for two successive periods. When the voltages at the lines 161 and 163 switch from their normal state to their second state, the latching signal is interrupted in line 53 and a blanking signal is removed from the display circuit 39.

When the voltages in lines 161 and 162 are at their normal level which prevents a display of temperature, a transistor Q12 is kept off. As the voltage levels in the lines 161 and 163 switch to their second state when a reading is being commanded, the transistor Q12 is turned on since the voltage applied to its base is increased. The base of the transistor Q12 is connected to the output line 161 through a resistor R45 and series diodes CR9 and CR10. When a transistor Q12 is caused to so switch, its collector goes to a low value. The collector is connected with the output line 163 and thus holds the voltage in the output line 163 at its second level which is lower than its normal operating level. The emitter of the transistor Q12 is held at ground potential. A diode CR7 connected between the reset signal line 121 and the collector of the transistor Q12 also keeps the reset signal line 129 at a low level when the output lines 161 and 163 have been switched to their second state. This prevents any further reset signals in the line 121 from causing a rejection of the desired information to be displayed.

The output line 163 is connected directly with an AND gate 165. The output line 161 is connected to an input 167 of the AND gate 165 through the resistor R45 and a diode CR8 in series. When the output voltages of the lines 161 and 163 are in their normal non-acceptance state (161 low and 163 high), the signal level in blanking signal line is low and thus prevents the display portion of the circuit 39 from being operable. However, when the output levels of the lines 161 and 163 change to their second state (161 high and 163 low), the voltage output at the AND gate 165 increases and the blanking signal in line 135 permits display of the temperature being measured at the moment. The mode signal line 79 is also connected with the input 167 to the AND gate 165 so that when its level is low (corresponding to operating the instrument in a "monitoring mode") the blanking signal in the line 135 will permit continuous display of the temperatures being measured.

A diode CR11 is connected between the blanking signal line 135 at the output of the AND gate 165 and an emitter of a transistor Q13. When the output of the AND gate 165 in the line 135 is at a low level, the transistor Q13 permits a transfer signal 43 to pass through a capacitor C15 into the base of the transistor Q13 and out its emitter into the latching signal line 53. This thus permits the latch 51 (FIG. 1) to accept every count from the counter 37 for each discharge pulse of the integrating capacitor C1. However, when blanking signal in the line 135 increases to a high level, the transfer of additional counts to the latch 51 is prohibited by turning off the transistor Q13 since it will see a high voltage at its emitter through the diode CR11. This holds a single count reading in the latch 51 and displays it continuously until the power is interrupted to the instrument by the switch 23. The transistor Q13 also remains in its "on" state when the mode signal is at a low level since the mode signal line 79 is connected to the emitter of the transistor Q13 through a diode CR12. Therefore, when the mode control switch 137 is set for its output to be at a low level when the instrument is operated in its "monitoring mode," continuous transfer of the transfer signal from the line 43 to the line 53 and thus into the latch 51 is assured.

By way of specific example, designations for the components described with respect to FIGS. 7 and 8 are given below:

| | |
|---|---|
| R16 - 240 K ohms | R27 - 33 K ohms |
| R17 - 4.7 M ohms | R28 - 82 K ohms |
| R18 - 249 K ohms | R29 - 5.1 K ohms |
| R19 - 100 K ohms | R30 - 10 K ohms |
| R20 - 240 K ohms | R41 - 47 K ohms |
| R21 - 1 K ohms | R42 - 3.3 K ohms |
| R22 - 15.8 K ohms | R43 - 10 K ohms |
| R23 - 15.8 K ohms | R44 - 5.1 K ohms |
| R24 - 24.9 ohms | R45 - 100 K ohms |
| R25 - 33 K ohms | R46 - 240 K ohms |
| R26 - 60 ohms | R47 - 100 K ohms |
| R48 - 2.4 K ohms | A3 - 741 |
| R49 - 33 K ohms | A4 - 741 |
| R50 - 240 K ohms | A5 - 741 |
| | A6 - 311 |
| C3 - 0.1 uF | |
| C4 - 33 uF | Q3 - 2N 3565 |
| C5 - 33 uF | Q4 - 2N 3565 |
| C6 - 0.033 uF | Q5 - 2N 3565 |
| C7 - 0.0022 uF | Q7 - 2N 4351 |
| C8 - 0.1 uF | Q8 - 2N 3565 |
| C9 - 1.0 uF | Q9 - 2N 4351 |
| C10 - 0.0047 uF | Q12 - 2N 3565 |
| | Q13 - 2N 3565 |
| CR 1 - 1 N 751 | |
| CR 2-B - 1N 914 | |

Figure 9:
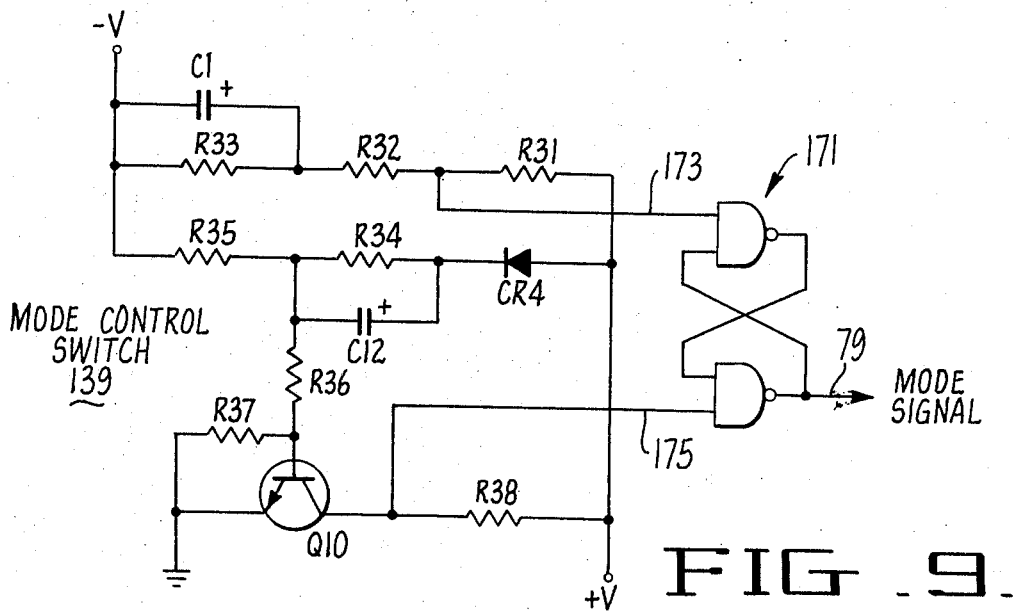
FIG. 9 is a detaied circuit diagram of the mode control switch of the circuit of FIG. 1.

A preferred mode control switch 137 of FIG. 1 is shown in a detailed circuit diagram in FIG. 9. A flip-flop 171 has an output connected with the mode signal line 79 that either maintains it at a high voltage level (temperature mode of operation) or at a low voltage level (monitoring mode of operation). A negative voltage pulse to an input 173 of the flip-flop 171 will cause its output level at the line 79 to go low. Conversely, a negative voltage pulse to an input 175 of the flip-flop 171 will cause the voltage level at the output 79 to go its high state.

Two capacitor/resistor parallel combinations are important in FIG. 9 in the operation of the mode control switch 139. Capacitor C11 and its parallel resistor R33 controls the voltage level of the input 173 of the flip-flop 171. The resistor R33 has one side connected to the −V voltage source and its other side connected to a resistor R32. A third resistor R31 is connected between the resistor R32 and the +V voltage supply. The input 173 to the flip-flop 171 is connected between the resistors R31 and R32.

The second capacitor/resistor circuit that is important is the parallel combination of C12 and R34, one end of which is connected through a diode CR4 to the +V voltage supply while its other end is connected through a resistance R35 to a −V voltage supply. The juncture between the parallel combination of C12 and R34 that is connected with the resistor R35 is also connected to a base of a transistor Q10 through a resistor R36, the base is also connected to ground through a resistor R37, thereby providing a steady bias to the base of the transistor Q10. The emitter of the transistor Q10 is connected with ground and its collector is connected to a voltage source (through a resistor R38) and to the input 175 of the flip-flop 171.

The time constant of the C11/R33 circuit is made to be less than the time constant of the C12/R34 circuit. When the supply voltage is turned on to the device by closing switch 23 after a long time has elapsed since it was last used, the input 173 of the flip-flop and the input 175 are both at a low level. However, C11 and C12 are both charging. C11 charges faster than C12 and thus the input 173 will go positive before the input 175 to the flip-flop. This will cause the voltage level at the output 79 of the flip-flop to go high for operating the circuit in its "temperature mode."

If power is interrupted by the switch 23 of the device for only a short period of time from when it was last used, the capacitor C11 and C12 have not had time to fully discharge but will discharge somewhat. C11 will discharge faster than C12 during the time that the power is disconnected from the circuit so that when the power comes back on, the input 173 to the flip-flop is at a low level while the input 175 to the flip-flop remains at a higher level due to the capacitor C12 being discharged very little. Since the capacitor C12 has discharged very little, its charge current when the power is turned back on is very small and not enough to again turn on Q10. Therefore, the voltage level at the input 175 to the flip-flop remains high while the voltage level at 173 is low and thus the mode signal output 79 is turned low for operating the instrument in its "monitoring mode."

In a specific example of the instrument being described herein, component values for the mode control switch 139 of FIG. 9 are shown below:

R31 - 100 K ohms
R32 - 18 K ohms
R33 - 240 K ohms
R34 - 240 K ohms
R35 - 100 K ohms
R36 - 240 K ohms
R37 - 68 K ohms
R38 - 47 K ohms
C11 0.1 uF
C12 - 10 uF
CR4 - 1 N 914
Q10 - 2 N 3565

We claim:

1. In an electronic instrument having an input for receiving from a transducer a voltage that is proportional to a condition such as temperature that is being sensed by the transducer, electronic circuits comprising:
   means including an integrating capacitor for integrating said voltage from a transducer, said integrating means being connected to said input for charging said capacitor an amount proportional to the magnitude of said voltage from the transducer,
   a free running binary counter having an output signal each cycle of the counter upon its reaching a predetermined count, said counter connected so that the periods between each of successive output signals are exactly the same,
   means connected to said integrating means for providing a discharge path for said capacitor,
   means for connecting said discharge means to said capacitor in response to each of said counter output signals,
   means responsive to the voltage across said capacitor for disconnecting said discharge means and for immediately beginning charging of said capacitor responsive to said input voltage when the capacitor voltage reaches a certain predetermined minimum,
   means for detecting the count of said binary counter upon operation of said discharge disconnecting means when said voltage reaches said predetermined minimum level, whereby the detected count of said counter is a measure of the capacitor discharge time and is proportional to the input voltage being measured.

2. The electronic instrument of claim 1 which additionally comprises a voltage power supply source level that is connected to both the instrument input for supplying the transducer and to the capacitor discharge means for providing a potential to which the capacitor is connected during the periods where said discharge means are connected, whereby variations in the voltage output of said source do not affect the detected count of said binary counter during the capacitor discharge.

3. In an electronic instrument having an input for receiving from a transducer a voltage that is proportional to a condition such as temperature that is being sensed by the transducer, electronic circuits comprising:
   means including measuring integrating capacitor for integrating said voltage from a transducer, said integrating means being connected to said input for charging said capacitor an amount proportional to the magnitude of said voltage from the transducer,
   a free running binary counter having an output signal each cycle of the counter upon its reaching a predetermined count,
   means connected to said integrating means for providing a discharge path for said capacitor, said discharge path means includes at least two different impedance values that are selectable by an external connection to distinct terminals of said instrument input, whereby a discharge time constant of said capacitor is controlled,
   means for connecting said discharge means to said capacitor in response to each of said counter output signals,
   means responsive to the voltage across said capacitor for disconnecting said discharge means and for immediately beginning charging of said capacitor responsive to said input voltage when the capacitor voltage reaches a certain predetermined minimum,
   means for detecting the count of said binary counter upon operation of said discharge disconnecting means when said voltage reaches said predetermined minimum level, whereby the detected count of said counter is a measure of the capacitor discharge time and is proportional to the input voltage being measured.

4. The electronic instrument of claim 1 wherein the input voltage remains connected to continuously charge said capacitor even during the periods that the capacitor is connected to said discharge means, whereby said capacitor begins charging immediately after said discharge means is disconnected from said capacitor without any additional switching being necessary.

5. In an electronic instrument having an input for receiving from a transducer a voltage that is proportional to a condition such as temperature that is being sensed by the transducer, electronic circuits comprising:
   means including an integrating capacitor for integrating said voltage from a transducer, said integrating means being connected to said input for charging said capacitor an amount proportional to the magnitude of said voltage from the transducer, a free running binary counter having an output signal each cycle of the counter upon its reaching a predetermined count, means connected to said integrating means for providing a discharge path for said capacitor, means for connecting said discharge means to said capacitor in response to each of said counter output signals, means responsive to the voltage across said capacitor for disconnecting said discharge means and for immediately beginning charging of said capacitor responsive to said input voltage when the capacitor voltage reaches a certain predetermined minimum, means for detecting the count of said binary counter upon operation of said discharge disconnecting means when said voltage reaches said predetermined minimum level, whereby the detected count of said counter is a measure of the capacitor discharge time and is proportional to the input voltage being measured, means monitoring the rate of change of said input voltage and emitting an electrical signal when said rate of change falls below a predetermined value, whereby said electrical signal is usable to indicate when the instrument is in a state to give a measurement of said condition, and means for increasing a value of impedance in said capacitor discharge means, whereby a steady state value of the input voltage is forecasted by the detected count of said counter in response to said control signal in advance of the input voltage reaching said steady state value.

6. In an electronic thermometer having a temperature sensing element connected to a voltage supply in a manner to develop a signal voltage level that is proportional to the temperature of said sensing element, electronic measuring and display circuits comprising:

means receiving said signal voltage level for integrating said signal voltage level, said integrating means including an electrical storage element that is alternately charged to a level proportional to the value of said signal voltage level and then discharged to a given voltage supply level, means for alternately switching said storage element between its charging and discharging states without any interval therebetween, said switching means maintaining every complete cycle of charging and discharging the storage element at exactly the same total time duration regardless of the signal voltage level developed by the temperature sensing element, and means for measureing the time duration that said storage element is in its discharge state, whereby said time duration is proportional to the temperature of said sensing element.

7. The electronic thermometer of claim 6 wherein said voltage supply that is connected to said temperature sensing element also provides said given voltage supply level to which said storage element is connected during discharge, whereby the discharge time of the storage element is substantially independent of the output of said voltage supply.

8. The electronic thermometer of claim 6 wherein said switching means includes a free running binary counter with an overflow signal connected to switch the storage element from its charging to its discharging states at the occurrence of every counter overflow signal.

9. An electronic thermometer, comprising:
a temperature transducer,
a voltage terminal connected to be supplied by a battery electrical power source,
means receiving power from said voltage terminal electrically connected to said transducer for developing a voltage that is proportional to the temperature of said transducer, and
means connected to said transducer voltage developing means for integrating said temperature proportional voltage, said integrating means including a capacitor that is alternately charged in response to said temperature proportional voltage and discharged by connection to the voltage of said voltage terminal, whereby a change in battery output voltage over time is self-compensating.

10. An electronic thermometer comprising:
a bridge circuit including a temperature transducer and three resistances connected in a closed loop wherein an output voltage proportional to the temperature of the transducer is generated,
a capacitor connected to be charged an amount proportional to the voltage output of said bridge,
a free running binary counter having an overflow signal each time said counter is reset to zero, the time between each of the overflow signals being exactly the same,
means initiated by each of said counter output signals for periodically connecting a discharging circuit to said capacitor without disconnecting said capacitor from said bridge, thereby to maintain recurring cycles of capacitor charge and discharge exactly the same,
means for disconnecting the discharge circuit from said capacitor when the voltage thereacross reaches a predetermined level, and thereby to cause the capacitor to begin charging again from the voltage output of said bridge, and
means responsive to said discharge circuit disconnecting means for reading and storing the count of said free running counter at the time that the capacitor discharge has ended.

11. An electronic thermometer, comprising:
a bridge circuit including a temperature transducer and three resistances connected in a closed loop wherein an output voltage proportional to the temperature of the transducer is generated,
a free running binary counter having an output signal at a certain binary count,
a capacitor connected to be charged an amount proportional to the voltage output of said bridge,
means responsive to the output signal of said counter for periodically initiating a discharge of said capacitor,
means for terminating the discharge of said capacitor when the voltage thereacross reaches a predetermined level,
means responsive to said discharge terminating means for reading and storing the count of said free running counter at the time that the capacitor discharge has terminated,
means responsive to the output voltage of said bridge for observing a temperature change of the transducer per unit time for either upward or downward temperature change, means responsive to said temperature change observing means for causing a temperature reading to occur when the bridge output voltage change per unit time becomes less than a predetermined value said temperature reading proportional to the count of said counter held by said reading and storing means, and means for adjusting the discharge time of said capacitor to add on a value of capacitor discharge time to that which would normally occur, whereby temperature of the body to be measured is forecasted in advance of the transducer becoming equalized in temperature therewith.

12. An electronic thermometer comprising a bridge circuit including a temperature transducer and three resistances connected in a closed loop wherein an output voltage proportional to the temperature of the transducer is generated, wherein said bridge circuit and said transducer comprise an entity that is physically and electrically disconnectible from the remaining portion of the electronic thermometer, at least one of said bridge resistances being adjustable for matching the bridge individually to its associated transducers for making the electrical output of the bridge substantially linear in a desired region of interest, a capacitor connected to be charged an amount proportional to the voltage output of said bridge, a free running binary counter having an overflow signal each time said counter is reset to zero, the time between each of the overflow signals being exactly the same, means initiated by each of said counter output signals for periodically connecting a discharging circuit to said capacitor without disconnecting said capacitor from said bridge, thereby to maintain recurring cycles of capacitor charge and discharge exactly the same, means for disconnecting the discharge circuit from said capacitor when the voltage thereacross reaches a predetermined level, and thereby to cause the capacitor to begin charging again from the voltage output of said bridge, a visual temperature display means, means connected to said free running binary counter for applying to said display means the count of said counter at the instant that the discharge means is disconnected from the capacitor, thereby to visually display a reading of the temperature of said transducer.

13. An electronic thermometer according to claim 12 wherein said capacitor discharging circuit includes two distinct impedance values and further wherein the physical entity of the bridge circuit and transducer includes means responsive to connection of said physical entity with the rest of the electronic thermometer circuit for selecting one of said two distinct impedance values, thereby to control the rate of capacitance discharge during its discharge cycle, whereby a single electronic thermometer can be used for direct measurements in degrees Centigrade or degrees Fahrenheit by merely substituting one integral bridge and transducer assembly for another.

14. An electronic thermometer comprising:

a bridge circuit including a temperature transducer and three resistances connected in a closed loop wherein an output voltage proportional to the temperature of the transducer is generated, an integrating analog-to-digital converter for generating pulses at periodic intervals, the width of each pulse being proportional to the output voltage of said bridge circuit, and means for measuring and displaying the width of said pulses, thereby to visually display a reading of the temperature of said transducer, means responsive to the output voltage of said bridge for observing a temperature change rate of the transducer for either upward or downward temperature change, means responsive to said temperature change observing means for developing a temperature acceptance signal when the bridge output voltage change rate becomes less than a predetermined value, and means for adjusting the width of each of said pulses by a fixed amount so that the temperature reading displayed at the time of the acceptance signal is that of the body with which the transducer is in contact before the temperature of the transducer is equalized with the temperature of the body being measured.

15. An electronic thermometer according to claim 14 which additionally comprises a mode control switch for selectively activating said temperature mode circuit, said mode control switch including a bi-stable element having two resistance-capacitive circuits connected therewith of different time constants so that when power is interrupted from the mode control switch for a substantial length of time said bi-stable element will switch to one of its states upon reapplying power to the circuit while a shorter discontinuance of power to the mode control switching circuit will cause the bi-stable element to switch to its second state upon resumption of application of power thereto.

16. An electronic thermometer comprising:

a temperature transducer, means responsive to changing electrical characteristics of said transducer for generating pulses at periodic intervals wherein each pulse has a width that is proportional to the temperature of the transducer, means for measuring the width of each of said pulses and displaying said widths directly in terms of temperature of the transducer, means responsive to the changing electrical characteristics of said transducer for monitoring the rate of temperature change of said transducer when increasing, means responsive to the changing electrical characteristics of said transducer for monitoring the rate of temperature change of said transducer when decreasing, means responsive to said increasing monitoring means and to said decreasing monitoring means for developing an electrical signal at an instant when either of said monitoring means detect a rate of change of the transducer temperature to be less than a predetermined value, whereby said electrical signal is usable to indicate when the temperature being measured can be read, and means for adding onto the temperature reading at said instant a proportional amount which predicts the temperature to which the transducer will equalize with its new surroundings.

17. An electronic thermometer for measuring temperature with a temperature transducer, comprising:
    means responsive to changing electrical signal characteristics of said transducer for displaying its temperature,
    means responsive to the changing electrical characteristics of said transducer for monitoring the rate of temperature change of said transducer when increasing,
    means responsive to the changing electrical characteristics of said transducer for monitoring the rate of temperature change of said transducer when decreasing,
    means responsive to said increasing monitoring means and to said decreasing monitoring means for developing an electrical signal at an instant when either of said monitoring means first detects a rate of change of the transducer temperature to be less than a predetermined value, but more than zero, whereby said electrical signal is usable to indicate when the temperature being measured can be read, and
    means for adding onto a temperature signal from the transducer a signal proportional to the difference between the transducer temperature at said instant and its ultimate temperature, thereby predicting the temperature to which the transducer would equalize with its new surroundings if given enough time.

18. The electronic thermometer of claim 17 which additionally comprises means normally blanking said display means for unblanking said display means in response to said electrical signal.

* * * * *